Feb. 9, 1960 R. N. FLECK ET AL 2,924,630
FLUID DIFFUSION FRACTIONATION
Filed June 28, 1957
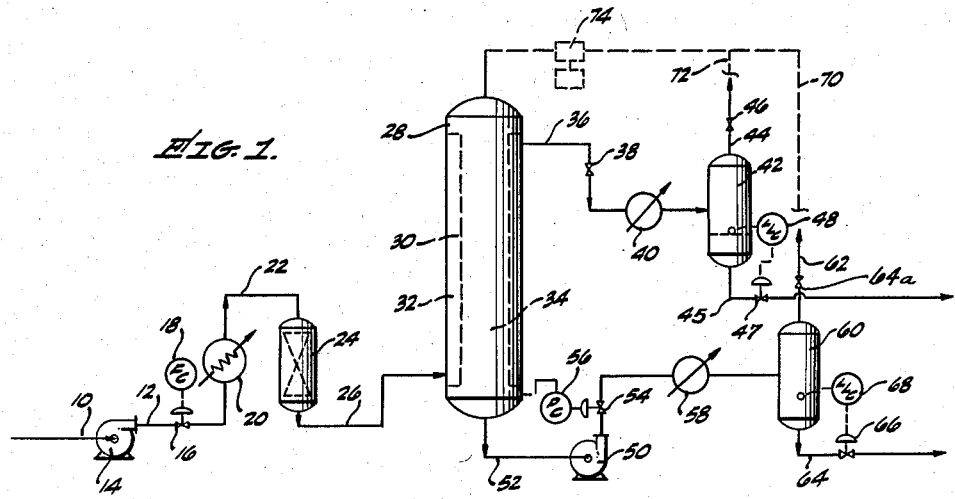
FIG. 1.
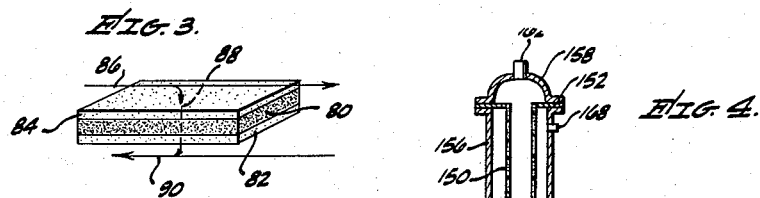
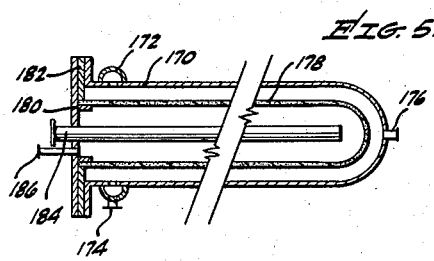
FIG. 3.
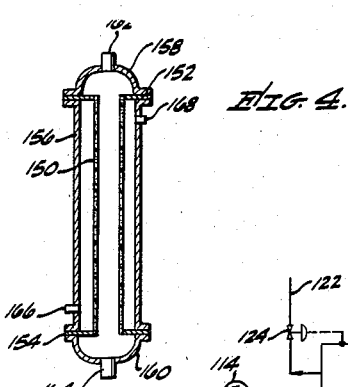
FIG. 4.
FIG. 5.
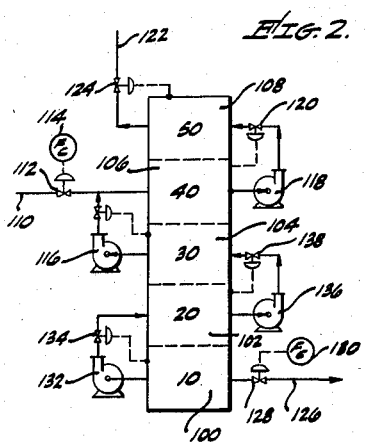
FIG. 2.
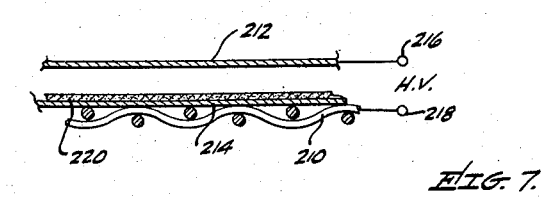
FIG. 6.
FIG. 7.
INVENTORS.
RAYMOND N. FLECK,
CARLYLE G. WIGHT,
BY
ATTORNEY.

to the fractionation of fluid mixtures, and in particular relates to the fractionation of such mixtures by means of preferential diffusion of some of the constituents through specially prepared solid barriers.

The separation of a light gaseous mixture into its constituent parts by the conventional processes of distillation, extraction, etc. involves many disadvantages. In the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of −5° F. are required. In the preparation of pure methane by a similar process a pressure between 500 and 600 pounds per square inch and a reflux temperature of about −150° F. are required. The compression and refrigeration of light gaseous mixtures is often too expensive to permit separations of this type and consequently large quantities of gaseous mixtures containing these and other light compounds are often wasted rather than perform expensive recovery operations. Similar problems are involved with extraction or absorption of such mixtures.

With heavier mixtures, the conventional processes are more readily applicable due to the fact that the extreme conditions of pressure and temperature referred to above are not required. However, with normally liquid and readily vaporizable mixtures containing constituents which are fairly close in boiling point, the heat and cooling duties required in distillation for example become rather high due to the fact that high reflux ratios and high boil-up rates are involved. For example, at a reflux ratio of 20, heat is removed at the top of the column which is approximately equivalent to 20 times the latent heat of vaporization corresponding to the quantity product flowing from the top of the column. Correspondingly high heat requirements are involved at the bottom of the column in the reboiler in order to maintain these reflux ratios. The same problems are involved in the solvent extraction and absorption processes involving high liquid to gas mixture ratios. With adsorption using solid granular adsorbents equivalent problems are involved using high solid adsorbent flow rates and correspondingly high heat and cooling duties for the adsorbent stream.

According to the present invention, a novel process is here provided for the fractionation of both light and relatively heavy fluid mixtures which avoids these previously mentioned problems and in which fractionation is effected according to the rate as well as the ability of various components of the mixture to diffuse through a particular fluid permeable diffusion barrier.

It is accordingly a broad object of this invention to provide an improved process for the fractionation of complex fluid mixtures.

A more specific object is to provide an improved fluid permeable solid barrier diffusion process for the separation of gaseous as well as liquid mixtures.

It is an additional object to provide a novel diffusion barrier for use in the fractionation process of this invention and which readily permits diffusion of some molecules of the feed while effectively preventing the passage therethrough of others.

Another object is to provide novel methods for preparing and maintaining such diffusion barriers.

It is also an object of this invention to provide suitable apparatus for effecting the foregoing objects.

Other objects and advantages of the present invention will become apparent to those skilled in this particular art as the description and illustration thereof proceed.

Briefly, the present invention comprises an improved fluid mixture fractionation process in which the fluid mixture is passed adjacent a special fluid permeable solid barrier, including a particular solid material hereinafter more fully described. During this passage part of the feed mixture is permitted to diffuse rapidly through the barrier into the adjacent space. A solid barrier material has now been found which exhibits the usual diffusion barrier characteristics and through which the diffusible fluids diffuse at a rate according to their normal differences in diffusibility, which material is in addition effective in selectively preventing certain fractions of the fluid mixture from diffusing through the barrier at all. In other words, as to that fraction of the feed material which is diffusible through the barrier, the normal differences in diffusion rates apparently exist, but the barrier also effectively excludes and prevents any diffusion at all of the remaining fraction of the feed material.

The particular barrier involved and the process of using the barrier must be clearly distinguished from the normal barriers and diffusion processes heretofore known in which the entire feed mixture will diffuse through the barrier given sufficient time and sufficient barrier area. In the conventional process the enrichment obtained by diffusion through the barrier is obtained essentially due to the higher rate of diffusion of the lower molecular weight molecules. The higher molecular weight molecules are diffusible, but at a lower rate.

In the present invention however, some of the higher molecular weight molecules and particularly some molecules with special molecular shapes, are simply not diffusible at any rate whatsoever through the barrier. Thus the normal enrichment obtained in the diffusible fraction due to differences in diffusion rates and which is obtained in the conventional diffusion processes is enhanced in the present process by the selectivity of the barrier in excluding from diffusion the large molecules present in the feed stream.

In the simplest modification of the process of the present invention the fluid-permeable barrier separates two zones from each other. On one side of the barrier is maintained an input or feed zone into which the fluid mixture to be fractionated is introduced. On the opposite side of the barrier is an output or product zone into which certain components of the feed mixture diffuse through the barrier and from which they are removed as a product fluid. The product zone is either maintained at a lower pressure than the feed zone, or it is maintained so as to have consistently a lower concentration of diffusible components than the feed chamber, or both. The output chamber will contain a fluid in either the liquid or gaseous phase corresponding to the phase existing in the feed chamber. Under these conditions there is a diffusion gradient or driving force generated between the two zones which tends to move diffusible components of the feed fluid from the feed zone to the product zone through the barrier. The passage through the barrier by means of which the diffusible fraction flows from one zone to the other is the special fluid-permeable solid material having the selective diffusion properties referred to briefly above.

The solid material from which the barrier is produced comprises a special zeolitic adsorbent, which is a metallo alumino silicate activated by partial dehydration and which has in its crystalline structure pores which throughout the crystal have remarkably uniform diameters. These materials are readily prepared from natural materials or they may be prepared synthetically from suitable sources of the essential ingredients which make up the crystal structure. The sizes of the openings or the pore diameters may be varied according to the elemental composition of the crystal. This pore diameter may be varied from as low as about 3 A. to as high as about 15 A. The composition of one typical synthetic zeolite having a pore size of about 3 A. is $K_2O \cdot Al_2O_3 \cdot (SiO_2)_2$. Another zeolite having a pore size of about 4 A. is $Na_2O \cdot Al_2O_3 \cdot (SiO_2)_2$. These may be prepared by heating essentially stoichiometric quantities of alumina and silica with excess caustic alkali under pressure. The excess is washed out to produce the hydrous gel, the solid material is then activated by partial dehydration.

Part of the sodium in this material can be ion exchanged with concentrated salt solutions at superatmospheric pressure and temperatures of 150–300° C. to introduce other metal ions such as calcium to produce

having a pore size of about 5 A. Certain naturally occurring minerals, such as chabazite, analcite, gmelinite, and the like, can be heated to dehydrate the molecule and obtain an activated zeolitic adsorbent similar in adsorption properties to the manufactured materials. These natural and synthetic materials are all zeolites and their sodium and calcium derivatives are very stable adsorbents which apparently have "pores" available for adsorption which are quite uniform in size.

Other variations of the zeolitic silicate adsorbent may be produced having uniformly sized pores on the order of 10 to 13 A. These materials have compositions corresponding essentially to $5CaO \cdot 12Al_2O_3 \cdot 30SiO_2$, this material having uniformly sized pores at about 10 A. By modifying the structure to include a different metal ion, a composition corresponding essentially to

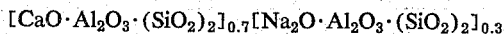

is produced and in this case the uniform pores have diameters of substantially 13 A. Further details with respect to the manner of preparing the present type of zeolitic adsorbent and of varying the pore size thereof are given in British Patent No. 777,233. Since the pore sizes in which these adsorbents can be prepared are of molecular magnitude, and since their selectivity lies in the fact that the molecular size of some materials is small enough that such materials can enter the pores of the adsorbent whereas the molecular size of other materials is too large to permit entry into the pores of the adsorbent, these zeolitic adsorbents are commonly referred to as molecular sieves. (See U.S. Patents Nos. 2,818,137 and 2,818,455.) Moreover, they are available commercially under such name. Thus, the Linde Company markets the above-described zeolitic adsorbent having a pore diameter of 5 A. under the name "Molecular Sieves 5 A."

The process of the present invention, several representative forms of the barrier, and several ways of preparing the novel barrier according to this invention will be more readily understood by reference to the accompanying drawings in which:

Figure 1 is a process flow sheet indicating in general the process flow in the diffusional fluid fractionation process of the present invention, Figure 2 indicates schematically a modification of the process indicated in Figure 1 to include a plurality of serially connected diffusion stages, Figure 3 is a schematic drawing indicating one form of diffusion barrier together with a highly permeable solid supporting means, Figures 4 and 5 show cross section views of apparatus in which a cylindrical barrier is employed through which the fluid fraction diffuses, Figure 6 is a cross section view of a novel form of the barrier, and Figure 7 is a fragmentary view in cross section of another novel form of the barrier according to this invention.

Referring now more particularly to Figure 1, the process will be described in terms of a specific example in which an aromatic gasoline contaminated with substantial quantities of normal paraffin hydrocarbons is treated for the selective diffusion of the paraffins from the aromatic constituents in order to increase substantially the antiknock rating of the gasoline stream. A catalytically reformed depentanized light gasoline stream has the properties given in Table 1.

TABLE 1

*Feed gasoline*

| | |
|---|---:|
| Boiling range ° F | 120–350 |
| Sulfur, percent by wt | 0.02 |
| Antiknock rating (F–1+3 ml. TEL) | 91.3 |
| Aromatics vol. percent | 24.0 |
| Normal paraffins vol. percent | 20.0 |

This gasoline stream is pumped through lines 10 and 12 by means of feed pump 14 at a pressure of about 15 p.s.i.g. and at a rate of about 1000 barrels per day controlled by valve 16 and flow controller 18. This material is passed through heating means 20, which preferably includes an exchanger with one or more of the diffusion zone effluent streams. In any event, the gasoline stream is heated and vaporized at a temperature of about 430° F. and passes through line 22 into guard chamber and drier 24. Chamber 24 is filled with a desiccant adsorbent having an affinity for water and for other highly polar materials such as sulfur and nitrogen compounds. Suitable adsorbents are hereinafter defined in further detail. The thus treated gasoline vapor continues through line 26 into diffusion column 28. A cylindrical or other shaped diffusion barrier 30 is provided internally in column 28 dividing the diffusion zone into one or more feed zones 32 and one or more output or product zones 34. The feed gasoline vapor passes from one end of feed zone 32 past barrier 30 toward the outlet at the opposite end of the feed zone from which line 36 opens. During the passage of the feed vapor past the barrier surface, which comprises a zeolitic metallo alumino silicate having pore diameters on the order of 5 A., the normal paraffin hydrocarbons readily diffuse through the pores of the barrier while the aromatic, the naphthenic, and the isoparaffinic hydrocarbons of satisfactorily high antiknock rating are prevented from diffusing through the barrier by reason of the fact that their molecular sizes are too great to enter the 5 A. pores of the barrier material.

As a result, the remaining non-diffused constituents of the feed gasoline vapor include these aromatic, naphthenic, and isoparaffinic hydrocarbons and contain only a trace of normal paraffin hydrocarbon which has not diffused through the barrier. The non-diffused fraction is removed at a rate of about 810 barrels per day through line 36 controlled by valve 38 and is cooled and condensed in exchanger-cooler 40. The condensate is discharged into product drum 42 from which any sweep gas fraction is removed by means of line 44 and valve 46 and recirculated. The liquid fraction flows from the bottom of drum 42 through line 45 at a rate controlled by valve 47 and liquid level controller 48. The physical properties of this stream are given immediately below in Table 2.

TABLE 2

Aromatic gasoline product

| | |
|---|---|
| Boiling range °F | 120–350 |
| Sulfur percent by weight | 0.02 |
| Antiknock rating (F-1+3 ml. TEL) | 97.0 |
| Aromatics vol. percent | 29.0 |
| Normal paraffins vol. percent | 0.5 |

Output or product zone 34 of diffusion chamber 28 is maintained at a pressure substantially equal to that in feed zone 32 and a sweep gas of methane is maintained through output zone 34 to generate the diffusion differential across the barrier 30. This sweep gas flow is maintained by pump or blower 50 in removing vapor from product zone 34 through line 52 at a rate controlled by valve 54 and pressure controller 56. This is the diffused normal paraffin concentrate vapor which has passed through the barrier into the methane sweep gas flow. This vapor is cooled and condensed in exchanger-cooler 58 and is introduced into drum 60. The noncondensed sweep gas accumulating therein is removed by means of line 62 and valve 64a. It is combined with that recovered in separator 42, and recirculated through product zone 34 by means of compressor 74. The liquid product is removed from the bottom of the drum by means of line 64 at a rate of 190 barrels per day controlled by valve 66 and liquid level controller 68. This gasoline stream comprises the very low grade fraction of the feed gasoline vapor and consists of a 95% concentrate of the normal paraffin hydrocarbons. The physical properties of this stream are given below in Table 3.

TABLE 3

Contaminant fraction

| | |
|---|---|
| Boiling range °F | 120–350 |
| Sulfur percent by wt | 0.005 |
| Antiknock rating (F-1+3 ml. TEL) | 15.0 |
| Aromatics vol. percent | 0.0 |
| Normal paraffins vol. percent | 95.0 |

From the foregoing data it is noted that the fractionation has been approximately 95% complete insofar as the removal of normal paraffins from the gasoline feed is concerned. Such a separation is simply impossible in the conventional fluid fractination process due to the fact that the normal paraffins have a wide boiling range and extend completely throughout the boiling range of the feed stream. Even in the case of selective adsorption processes in which the normal paraffins are selectively adsorbed by the adsorbent, it must be noted that in this case the feed fluid only vaporizes once and only condenses once rather than the numerous adsorptions and desorptions required in high reflux ratio adsorptive processes and involving equivalent heat loads. Thus an extensive saving in heat and cooling duty is effected.

Here the diffusion driving force is the concentration gradient across the barrier, i.e., the 20% concentration of n-paraffins near the inlet of feed zone 32, and a substantially lower concentration of n-paraffins in the methane sweep gas in product zone 34. If desired, the product zone pressure may be decreased to enhance this gradient.

Referring again to Figure 1, a second example will be described in which the barrier comprises a zeolitic silicate having pore diameters of the order of 4 A. and in which the feed fluid comprises natural gas having the following approximate composition:

TABLE 4

Feed gas composition

| Component: | mol percent |
|---|---|
| Methane | 85 |
| Ethane | 8 |
| Propane | 3 |
| Butanes | 3 |
| $C_{5+}$ | 1 |
| | 100 |

The natural gas flows into the system at a rate of 2500 M s.c.f.d. (thousand standard cubic feet per day) through line 10 by means of blower 14 at a pressure of 50 p.s.i.g. and is heated to a temperature of about 150° F. in heater 20. This heating step for gaseous feeds is optional, but is desirable since diffusion rates increase at higher temperatures. The gas then passes through drierguard chamber 24 in which the function is identical to that in the previous example. The feed fluid then progresses through diffusion chamber 28, particularly feed zone 32. During passage upwardly through this zone the methane and ethane diffuse readily through the 4 A. barrier under the influence of a pressure gradient while the propane and heavier hydrocarbons are prevented from diffusion due to their larger molecular sizes. The nondiffused propane and butanes are discharged through line 36, cooled in cooler 40, and introduced into separator 42. Simultaneously with the flow of feed fluids through the feed zone 32, product zone 34 is also maintained at the substantially lower pressure of about 5 p.s.i.g. As the methane and ethane diffuse through into the low pressure product zone 34 they are rapidly removed therefrom by means of blower 50 and passed through cooler 58 into separator 60. In this modification separators 42 and 60 are not necessarily vapor liquid separators, but rather fluid containing means for receiving each product stream.

In the immediately foregoing example the driving force across the barrier was for the most part a pressure gradient since the feed zone 32 is maintained at 50 p.s.i.g. while the product zone 34 is maintained at about 5 p.s.ig. Depending on the barrier area and the mechanical strength thereof, pressure differentials of from a few p.s.i. up to several hundred, or even over a thousand p.s.i. may be used.

Effective fractionation can be obtained without this pressure gradient, the absence of which makes physical construction of the barrier substantially more simple than one which must be capable of withstanding pressure differences of this or higher magnitudes.

The diffused product removed from separator 60 flows through line 64 and has the following composition:

TABLE 5

Diffused product composition

| Component: | Mol percent |
|---|---|
| Methane | 91.5 |
| Ethane | 8.5 |
| Propane and heavier | 0.0 |
| | 100.0 |

The nondiffused components are removed from separator 42 through line 44 as a fluid mixture having the following composition:

TABLE 6

Nondiffused product composition

| Component: | Mol percent |
|---|---|
| Methane and ethane | 0.0 |
| Propane | 43.0 |
| Butane | 43.0 |
| $C_{5+}$ | 14.0 |
| | 100.0 |

The foregoing examples are intended to illustrate several modifications of the process of this invention and are not intended as limitations thereof. Obviously the process is applicable to diffusional separation of other fluid mixtures with the selection of the barrier material for a particular pore diameter being made after a consideration of the molecular size of the components contained in the feed fluid. For example, in a feed vapor containing a mixture of benzene and normal hexane, the 5 A. barrier will readily separate the benzene as a nondiffusible concentrate from the diffusible normal hexane component. This may be done by means of a pressure gradient as a driving force, or if desired toluene vapor or normal pentane vapor or other fluids readily separable from the normal $C_6$ constituents may be used as the sweep gas. As another example, the removal of normal paraffin hydrocarbons by the process of this invention may be carried out on relatively heavy oils containing hydrocarbons in the $C_{10}$ through $C_{20}$ range and boiling approximately between about 400° F. and 750° F. The boiling range of such materials requires that very low operating pressures be used in order to avoid raising the temperatures necessary to maintain this stream in the vapor phase. An operating temperature of about 760° F. is satisfactory at atmospheric pressure. The sweep gas for such a feed stream is preferably ammonia. This is readily separable from the products. Desirably however, such fluid mixtures are treated in the liquid phase.

Referring now more particularly to Figure 2, a schematic process flow sheet of the process of this invention is shown modified to the extent that a plurality of serially connected diffusion zones is provided in order to overcome any leakage flow of the nondiffusible components through the diffusion barrier which might occur. A plurality of diffusion zones is provided, namely zones 100, 102, 104, 106, and 108, and any more which may be desired. These are maintained by means of the pumps and controls associated therewith at a series of increasing pressures, for example at 10, 20, 30, 40, and 50 p.s.i.g. indicated in Figure 2. The feed mixture is introduced to feed zone 106 by means of line 110 at a rate controlled by valve 112 and flow controller 114. It is mixed with undiffused material removed by means of pump 116 from zone 104 and is introduced at 40 p.s.i.g. into the feed zone. The diffusible component diffuses from zone 106 under the influence of a 10-pound pressure gradient toward the lower pressure through the barrier indicated by the broken line between zones 106 and 104. The undiffused material is removed from the outer end of feed zone 106 by means of blower 118 and is passed at a rate controlled by valve 120 at a pressure of 50 p.s.i.g. into zone 108 at a rate sufficient to maintain the 40 p.s.i.g. pressure in the feed zone. Here any residual quantity of diffusible component diffuses through the barrier toward the lower pressure into zone 106 while the nondiffused fraction is removed at the other end through line 122 at a rate controlled by valve 124 to maintain the 50 p.s.i.g. pressure.

The pressure gradient maintains the diffusion through the four indicated barriers in a downward direction pressurewise, that is from zone 108 toward 100. The diffusible constituent is removed as a concentrate by means of line 126 at a rate controlled by valve 128 and flow controller 130 from the low pressure zone 100. Any nondiffusible fraction is pressured to 20 p.s.i.g. by blower 132 and is returned at a rate controlled by valve 134 to the next higher pressure zone 102. Diffusion proceeds downwardly toward zone 100 and again any nondiffusible fraction is returned by blower 136 at a pressure of 30 p.s.i.g. at a rate controlled by valve 138 into zone 104. By this means the selective diffusion principles of the present invention may be enhanced by the provision of serially connected stages in order to achieve virtually complete fractionation of a given feed mixture.

The preceding description discloses serially connected diffusion zones in order to achieve substantially complete multistage fractionations. Each diffusion zone in the process of this invention may comprise a plurality of zones connected in parallel, into each of which a small stream of the feed fluid is introduced and from each of which streams of undiffused as well as diffused fractions are removed. Effectively this constitutes one large diffusion zone due to the parallel connection and in which the cross sectional area through which diffusion may occur substantially increases the permissible throughput. Such parallel connection is not illustrated in the attached figures since it is obvious to one skilled in the art as simply a parallel connection of diffusion zones such as that shown in Figure 1. In such a connection of course all of the feed inlets are manifolded together, all of the nondiffused fraction outlets are manifolded together, and all of the diffused component outlets are similarly connected.

Referring now more particularly to Figure 3, a simplified drawing of one form of zeolitic barrier is shown. In this barrier a thin layer of the zeolitic silicate of any selected pore diameter is supported on a highly fluid-permeable solid supporting material 82. Suitable supporting materials include certain fluid-permeable plastics, fluid-permeable sintered metals, permeable ceramic type materials such as Alundum, aloxite and the like. When a single supporting surface such as 82 is employed, the zeolitic barrier material may be maintained either in the form of a filter cake on one surface of the permeable solid support, or it may be mechanically pressed into or deposited in the pores of the fluid-permeable material, as well as a surface layer on its surface or by other means. If desired, an optional upper layer of the same or similar materials 84 may be added thus sandwiching the barrier material 80 therebetween. In any event, the diffusion process takes place transversely through the layer from a feed mixture flowing in the direction indicated by 86, transversely through the barrier 80 in the direction indicated by 88, and into the space on the opposite side of the barrier indicated at 90, through which a sweep gas may flow if desired.

Referring now more particularly to Figure 4, a coaxial modification of the barrier, which is directly suitable to the type of diffusion chamber 28 shown in Figure 1, is shown in a detailed sketch as a vertical cross sectional. Here the diffusion barrier consists of a central tube 150 supported at its upper and lower ends by annular plates 152 and 154 respectively. This annular plate is held between the flanges of surrounding conduit 156 and end closures 158 and 160. As indicated previously, the barrier material may be in the form and produced by any of the procedures previously or hereinafter described. Inlet means and outlet 162 and 164 are provided for the passage of fluid within cylindrical barrier 150. Inlets and outlets 166 and 168 are provided for the flow of fluid through the annular space surrounding barrier 150. It should be understood that either of these may be the feed or product zones previously described. In the case where the barrier constitutes a layer such as a deposit or filter cake or the like existing on only one side of a permeable support, it is preferred that the concentration gradient or pressure gradient and the corresponding diffusion flow should be first through the deposited barrier and then through the supporting permeable solid behind it.

Referring now to Figure 5, a modification of the diffusion cell shown in Figure 4 is shown. An external enclosing shell 170 is provided at one end with a manifold 172 and fluid connections 174 and 176. This surrounds the permeable barrier 178 which is connected at one end by means of a retainer ring 180 to its associated flange 182. Central conduit 184 extends along the inner side of the barrier along the longitudinal axis of this diffusion cell. Feed gas flow may be from manifold 172 to the right toward outlet 176 while connection 184 is connected to the suction side of a compressor or vacuum pump. If a sweep gas is to be employed, then an additional outlet 186 is provided for the removal of the diffused component in addition to the sweep gas introduced through line 184. As previously indicated, these flows may be reversed depending upon the structure of the diffusion barrier.

Referring now to Figure 6, a vertical cross section of another form of diffusion barrier is shown in which a wire or other reinforcing mesh 190 having relatively wides spaces between the mesh elements, is provided. A single layer of the zeolitic silicate solids 192 is positioned between the elements of mesh 190. The mesh and solids are then covered with a solidifiable material such as a casting resin, a molten metal, or other material which is allowed to harden. This forms a rigid solid matrix reinforced by the wire mesh in the form of a very thin sheet containing the zeolitic particles. The sheet at this point has upper and lower surfaces 194 and 196. The sheet is then treated by means of an abrasive, by milling, by chemical etching or by other means to remove the outer layers 198 and 200 of each side thereby exposing upper and lower surfaces 202 and 204 of each zeolitic particles. The matrix material 206 remains and this matrix is still reinforced mechanically by means of mesh 190 which is not exposed during the surface removal. The quantity removed is preferably on the order of 5 to 25% of the original average thickness of the zeolitic particles. In this way, assuming spherical particles, the exposed area of each particle now open for diffusional flow approximates 75% to 90% of the maximum cross section through each particle. Of the surface of the thus treated sheet, between about 60 and about 85% of the overall area is now exposed silicate surface open for diffusion. This constitutes a preferred form of the barrier used in the practice of the present invention. Of course the particles of zeolite need not be spherical, however better packing within the mesh is obtained with such particles. Preferably they are closely screened so as to be all substantially the same mesh size.

Although the description of Figure 6 was restricted to the preparation of the barrier as flat sheets, obviously the same techniques can be utilized to produce conical, cylindrical or other geometrical barrier shapes provided proper forms are used to determine the original outer surfaces of the matrix.

Referring finally to Figure 7, an additional modification of the barrier of this invention is shown in which an electrostatic charge is applied in order to precipitate and maintain a layer of the active zeolitic silicate solids. The electrostatic forces are applied between a fluid-permeable mesh 210 and another electrode 212. Superimposed on permeable electrode 210 is a highly fluid-permeable supporting layer 214. This may, in low temperature processes, be a tightly woven cloth, an asbestos cloth may be substituted in higher temperature processes, or one of the ceramic fluid-permeable materials mentioned previously may be used. An aerosol of the zeolitic silicate solids in a suitable gas is then prepared using finely powdered solids. This suspension or dispersion is then circulated through the equipment through the space between support layer 214 and electrode 212 so as to achieve a substantially uniform suspension in the system. The high voltage is then applied at terminals 216 and 218 which effectively precipitates on supporting layer 214 a fluid-permeable layer 220 of the zeolitic solids. In order to achieve uniformity of this deposit, preferably the high precipitating voltage is applied only for a sufficient time to precipitate a relatively minor proportion of the solids present in the circulated aerosol and then the system is vented to remove the excess solids suspension while the application of the same or a somewhat lower voltage is maintained. The voltage may be continued to maintain the layer if desired during the subsequent diffusional operations.

Obviously other forms of the barrier described generally herein with several specific illustrations will occur to those skilled in the art. The foregoing illustrations of specific barriers are given by way of example only and the form and the manner of preparation does not appear to be particularly critical in the practice of the present invention. However, the invention does depend for its success upon the maintenance of a stable solid surface of relatively large exposed area and relatively small thickness of the particular types of zeolitic metallo alumino silicate solids having substantially uniformly sized pores through which diffusion takes place.

In some cases when the zeolitic silicate is treated to form the diffusion barriers above described, adverse effects may result from the use of solvents or other media present during the fabrication of the barrier. For example, in the preparation of a barrier using a casting resin, traces of solvents may tend to plug or otherwise reduce the diffusion capacity of the solids. It is within the contemplation of the present invention in such cases to first saturate the zeolitic solids with an adsorbable gas or liquid of a type which will enter the pores of the solids. In this way the adsorption capacity is temporarily neutralized thereby preventing other materials such as solvents or the like from entering the pores during the course of barrier fabrication. Such pretreating materials may comprise, in the case of the 4 and 5 A. zeolites, a high molecular weight normal paraffin hydrocarbon such as the normal $C_{25}$ to $C_{40}$ hydrocarbons. These may be removed later by sweeping a gas such as ammonia for example through the barrier. This tends to displace the pretreating material and leaves the diffusion paths open for subsequent diffusion operation. In the case of the 10 and 13 A. or other large diameter pore silicates, materials with larger molecules may be employed such as naphthalene or the like.

Some of these barrier zeolites retain at least some adsorption capacity and therefore tend to adsorb rather strongly polar materials to varying degrees. This may interfere with the fractionation of feed fluids because such adsorption may reduce the diffusion capacity. Accordingly it is contemplated in this invention to contact the feed stream first with a material which exhibits very strong adsorptive forces for these polar materials and remove them from the stream to be treated. This pre-adsorption or pretreating of the feed may be accomplished by contacting the feed stream with an inorganic halide such as copper chloride, calcium chloride, magnesium chloride, and the like. A bed of granular zeolitic silicate of 10 A. to 13 A. pores may also be used. In this way large and highly polar materials such as ethers, thioethers, water, alcohols, mercaptans, and amines are readily removed from the feed. Also removable in this way are the highly polar nitrogen and sulfur compounds which commonly occur in small amounts in gasolines. These specifically include such materials as thiophene and the alkylated thiophenes, pyridine and alkylated pyridines. Thus this pretreatment removes these polar materials and prevents them from interfering with the subsequent fractionation in which the feed is separated into streams containing components of a specific molecular size or structure.

Although the pre-adsorption step prevents rapid deactivation of the diffusion barrier, some deactivation may eventually occur. It is within the contemplation of this invention to regenerate the barrier periodically by high temperature stripping with steam etc., to desorb impurities with hot flue gas or with other fluid media, or to burn off the impurities as in catalyst regeneration, or combinations of these and other treatments.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A process for separating a fluid mixture comprising at least two components of at least two different molecular sizes into a first fraction comprising components of smaller molecular size and a second fraction comprising components of large molecular size, which process comprises introducing said mixture into a feed zone and therein flowing said mixture substantially parallel to and in contact with a diffusion barrier comprising a solid partially dehydrated zeolitic metallo alumino silicate having intercrystalline pores of a substantially uniform diameter intermediate between the minimum molecular dimensions of the components of the first and second fractions; within a product zone on the opposite side of said diffusion barrier maintaining the partial pressure of said components of smaller molecular size at a value below that of the partial pressure of said components of smaller molecular size in said feed zone, whereby said components of smaller molecular size are caused to pass from said feed zone through said diffusion barrier into said product zone; withdrawing said first fraction from said product zone; and withdrawing said second fraction from said feed zone.

2. A process as defined by claim 1 wherein the said mixture is contacted with said diffusion barrier in the vapor phase.

3. A process as defined by claim 2 wherein said difference in partial pressure is maintained by maintaining the total fluid pressure in said fluid product zone at a value below the total fluid pressure in said feed zone.

4. A process as defined by claim 2 wherein said difference in partial pressure is maintained by flowing an inert sweep gas through said product zone at a rate sufficient to maintain the concentration of said components of smaller molecular size in said product zone at a value below that in said feed zone.

5. A process as defined by claim 2 wherein said mixture contains at least one component having a minimum molecular dimension less than about 3 A. and at least one component having a minimum molecular dimension greater than about 3 A., and said metallo alumino silicate is a potassium alumino silicate having the composition $K_2O.Al_2O_3.(SiO_2)_2$ and a pore diameter of about 3 A.

6. A process as defined by claim 2 wherein said mixture contains at least one component having a minimum molecular dimension less than about 4 A. and at least one component having a minimum molecular dimension greater than about 4 A., and said metallo alumino silicate is a sodium alumino silicate having the composition $Na_2O.Al_2O_3.(SiO_2)_2$.

7. A process as defined by claim 2 wherein said mixture contains at least one component having a minimum molecular dimension less than about 5 A. and at least one component having a minimum molecular dimension greater than about 5 A., and said metallo alumino silicate is a calcium sodium silicate having the composition $CaO.Al_2O_3.(SiO_2)_{20.7}.Na_2O.Al_2O_3.(SiO_2)_{20.3}$.

8. A process as defined by claim 2 wherein said mixture contains at least one component having a minimum molecular dimension less than about 10 A. and at least one component having a minimum molecular dimension greater than about 10 A., and said metallo alumino silicate is a calcium silicate having the composition $5CaO.12Al_2O_3.30SiO_2$.

9. A process as defined by claim 2 wherein said mixture contains at least one component having a minimum molecular dimension less than about 13 A. and at least one component having a minimum molecular dimension greater than about 13 A., and said metallo alumino silicate is a sodium alumino silicate having the composition $5Na_2O.6Al_2O_3.15SiO_2$.

10. A process according to claim 2 wherein said mixture essentially comprises normal paraffin hydrocarbons and hydrocarbons other than normal paraffins.

11. A process for separating a fluid mixture comprising at least two components of at least two different molecular sizes into a first fraction comprising components of smaller molecular size and a second fraction comprising components of larger molecular size, which process comprises introducing said mixture into a feed zone and therein flowing said mixture in the vapor phase substantially parallel to and in contact with the surface of a diffusion barrier comprising a solid partially dehydrated zeolitic metallo alumino silicate having inter-crystalline pores of a substantially uniform diameter intermediate between the minimum molecular dimensions of the components of said first and second fractions, whereby the components of said first fraction diffuse through said barrier to the opposite side thereof; flowing an inert sweep medium in the vapor phase through a product zone maintained on said opposite side of said diffusion barrier, said sweep medium having a boiling point appreciably outside the boiling range of said mixture and the rate of flow of said sweep medium being sufficient to maintain the concentration of the components of said first fraction in said product zone at a value below that in said feed zone; removing a non-diffused product mixture comprising said second fraction and said sweep medium from said feed zone; fractionating said non-diffused product mixture to separate said sweep medium from said second fraction; returning the sweep medium so separated to said product zone; removing a diffused product mixture comprising said first fraction and said sweep medium from said product zone; fractionating said diffused product mixture to separate said sweep medium from said first fraction; and returning the sweep medium so separated to said product zone.

12. A process as defined by claim 11 in which the direction of flow of said sweep medium in said product zone is opposite to the direction of flow of said mixture in said feed zone.

13. A process as defined by claim 11 in combination with the step of maintaining the pressure in said product zone at a value lower than that in said feed zone.

References Cited in the file of this patent

UNITED STATES PATENTS

| | | |
|---|---|---|
| 2,159,434 | Frey | May 23, 1939 |
| 2,306,610 | Barrer | Dec. 29, 1942 |
| 2,475,990 | Robertson | July 12, 1949 |
| 2,521,121 | Kilpatrick | Sept. 5, 1950 |
| 2,593,540 | Cornwell | Apr. 22, 1952 |
| 2,618,357 | Harlow | Nov. 18, 1952 |

OTHER REFERENCES

Barrer: Soc. of Chem. Ind. Jour., vol. 64, May 1945, pp. 130–135.